United States Patent
Murthy et al.

(10) Patent No.: US 12,145,486 B2
(45) Date of Patent: Nov. 19, 2024

(54) STOWABLE SEAT ASSEMBLIES AND VEHICLES INCLUDING SAME

(71) Applicant: Toyota Motor Engineering & Manufacturing North America, Inc., Plano, TX (US)

(72) Inventors: Vasudeva S. Murthy, Ann Arbor, MI (US); Christopher M. Vargo, Plymouth, MI (US); Nicholas J. Schutzman, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 114 days.

(21) Appl. No.: 17/991,276

(22) Filed: Nov. 21, 2022

(65) Prior Publication Data
US 2024/0166103 A1 May 23, 2024

(51) Int. Cl.
| | |
|---|---|
| *B60N 2/30* | (2006.01) |
| *B60N 2/36* | (2006.01) |
| *B60N 2/32* | (2006.01) |
| *B60N 2/90* | (2018.01) |

(52) U.S. Cl.
CPC .......... *B60N 2/3075* (2013.01); *B60N 2/3011* (2013.01); *B60N 2/305* (2013.01); *B60N 2/32* (2013.01); *B60N 2002/948* (2018.02)

(58) Field of Classification Search
CPC .... B60N 2/3011; B60N 2/3075; B60N 2/305; B60N 2/32; B60N 2002/948

USPC .......................................................... 297/15
See application file for complete search history.

(56) References Cited

U.S. PATENT DOCUMENTS

| | | | |
|---|---|---|---|
| 6,644,730 B2 | 11/2003 | Sugiura et al. | |
| 6,682,120 B2 | 1/2004 | Kamida et al. | |
| 7,374,222 B2 | 5/2008 | Mclaughlin et al. | |
| 7,828,358 B2* | 11/2010 | Mitsuhashi | B60N 2/309 296/65.05 |
| 8,408,628 B2 | 4/2013 | Yamazaki et al. | |
| 2003/0184129 A1* | 10/2003 | Honda | B60N 2/3097 297/14 |
| 2011/0109146 A1* | 5/2011 | Ida | B60N 2/3077 297/463.1 |
| 2015/0329019 A1* | 11/2015 | Abe | B60N 2/3011 296/65.09 |
| 2018/0105078 A1* | 4/2018 | Murray | B60N 2/01583 |
| 2019/0168637 A1* | 6/2019 | Abe | B60N 2/305 |
| 2023/0018025 A1* | 1/2023 | Kapusky | B60N 2/3011 |

FOREIGN PATENT DOCUMENTS

| | | |
|---|---|---|
| JP | 3985447 B2 | 10/2007 |
| KR | 100578186 B1 | 5/2006 |

* cited by examiner

*Primary Examiner* — Rodney B White
(74) *Attorney, Agent, or Firm* — Dinsmore & Shohl LLP

(57) ABSTRACT

A vehicle including a floor surface and a seat. The floor surface has a floor striker. The seat is movable between a seated state and a stowed state. The seat includes a seat cushion frame, a sear back, and a seat latch. The seat cushion frame has a seat striker. The seat back is rotatably coupled to the seat cushion frame. In the seated positon, the seat latch engaged with the floor striker. In the stowed state, the seat latch engages with the seat striker.

13 Claims, 3 Drawing Sheets

STOWABLE SEAT ASSEMBLIES AND VEHICLES INCLUDING SAME

TECHNICAL FIELD

The present specification generally relates to seat assemblies for use in vehicles and, more specifically, to a seat assembly that is movable into a stowed position disposed in a storage area below the floor using one user operating mechanism.

BACKGROUND

Motor vehicles include seat assemblies for supporting occupants above a floor in a passenger compartment of the vehicle. It is known to provide seat assemblies that pivot, rotate, and/or flip to be positioned into a recessed storage space located beneath the upper surface of the floor to expand the cargo carrying capacity in the passenger compartment. Such designs, however, are difficult for some users to operate, since the seat assembly must be lifted as it is pivoted, rotated, or flipped and require multiple handles or levers to be operated to move the seat into a stowed position. Thus, the designs require multiple hands or multiple steps to operate.

Thus, it remains desirable to provide a seat assembly that allows improved movement of the seat assembly from a seated position to a stowed position disposed in a storage space.

SUMMARY

In one embodiment, a vehicle includes: a floor surface and a seat. The floor surface has a floor striker. The seat is movable between a seated state and a stowed state. The seat includes a seat cushion frame, a seat back, and a seat latch. The seat cushion frame has a seat striker. The seat back is rotatably coupled to the seat cushion frame. In the seated positon, the seat latch engaged with the floor striker. In the stowed state, the seat latch engages with the seat striker.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
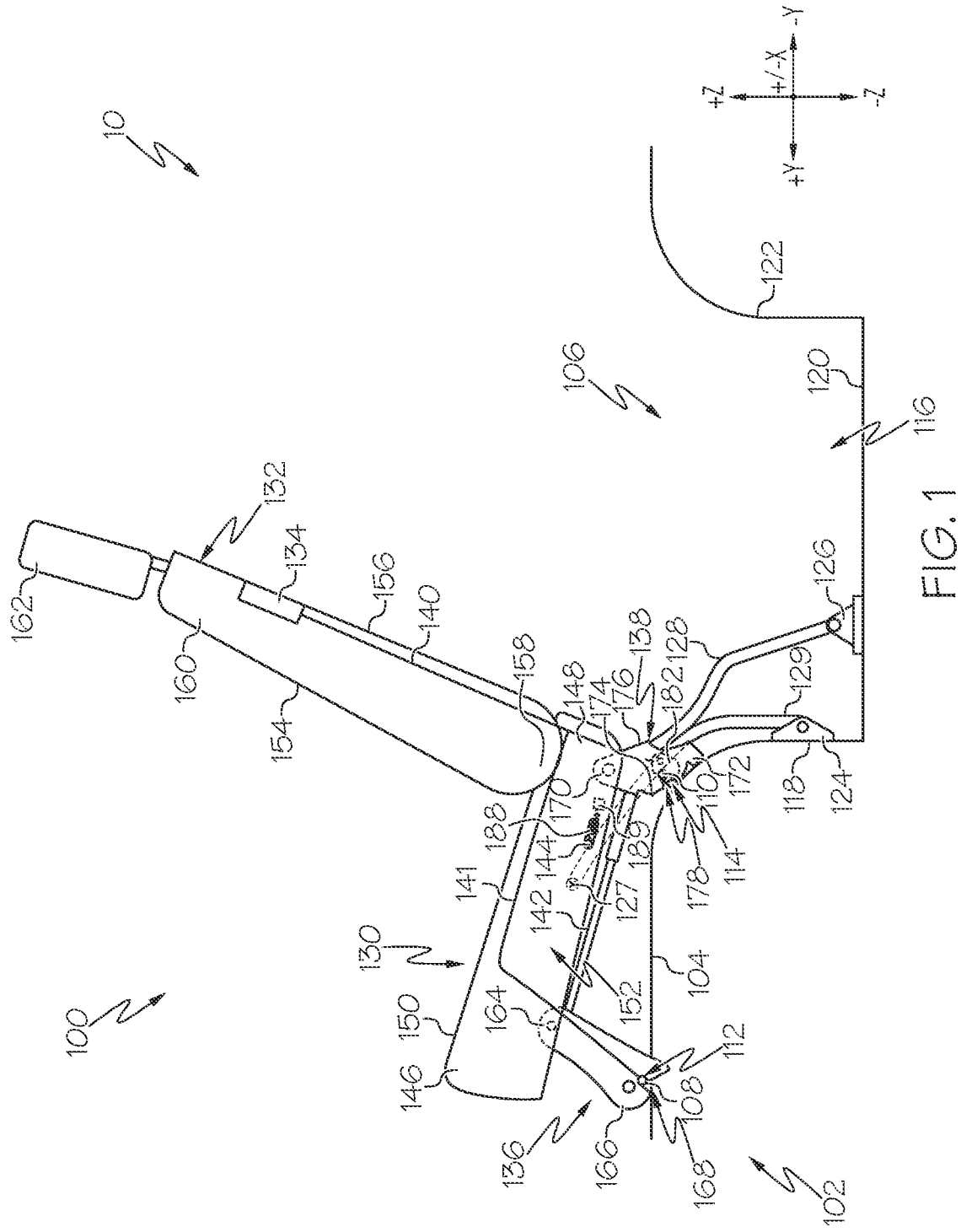
FIG. 1 schematically depicts a partial side view of a vehicle including a seat in a seated state, according to one or more embodiments shown and described herein.

Embodiments described herein are directed to vehicles including a stowable seat that moves from a seated state to a stowed state wherein a latch engages a floor striker in the seated state and the same latch engages a seat striker in the stowed state. In some embodiments, the latch is operated by a single mechanism. The vehicles described herein includes a seating area, a storage area, and a seat. The seating area includes a floor surface that has a front floor striker and a floor striker. The storage area is rearward of the seating area in a vehicle longitudinal direction. The seat is positionable between the seated state within the seating area and a stowed state in the storage area. The seat includes a seat cushion frame, a seat back, a handle, a front leg, and a rear leg. The seat striker is located in the seat cushion frame. The seat back is rotatably coupled to the seat cushion frame. The front leg is rotatably coupled to the seat cushion frame and is positionable between an extended position and a rotated position. The front leg includes a front seat latch operable by the handle. The front seat latch is positionable between a locked position and an unlocked position and engages the front floor striker when in the extended position. The rear leg is rotatably coupled to the seat cushion frame and includes a seat latch operable by the handle. The seat latch is positionable between a locked position and an unlocked position and engaged the floor striker when in the seated state and engaged the seat striker when in the stowed state. The seat striker moves relative to the seat cushion frame upon movement of the seat from the seated state to the stowed state to permit engagement with the seat latch when in the stowed state. In some embodiments, the seat striker moves relative to the seat cushion frame upon contact with the rotating rear leg during movement of the seat from the seated state to the stowed state to permit engagement with the seat latch when in the stowed state. Whenever possible, the same reference numerals will be used throughout the drawings to refer to the same or like parts.

As used herein, the term "vehicle longitudinal direction" refers to the forward-rearward direction of the vehicle (i.e., in the +/−vehicle Y direction depicted in FIG. 1). The term "vehicle lateral direction" refers to the cross-vehicle direction and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings.

Referring now to FIG. 1, a vehicle 10 including a seat 100 is shown positioned in the seated state. The seat 100 is located in a passenger compartment of the vehicle 10 that includes a seating area 102 with a floor surface 104 and a storage area 106 rearward of the seating area 102 in the vehicle longitudinal direction. However, it should be understood that the seat 100 may be located in any other location. Further, in some embodiments, the seat 100 may be a rear-facing seat 100 with the storage area 106 located forward of the seating area 102 in the vehicle longitudinal direction. In embodiments, the floor surface 104 includes a front floor striker 108 and a floor striker 110 attached to the floor surface 104. The front floor striker 108 is positioned forward of the floor striker 110 in the vehicle longitudinal direction. In embodiments, the front floor striker 108 and floor striker 110 may be bars to engage with a front seat latch 112 and a seat latch 114, described below. The storage area 106 defines a recessed opening 116 below the floor surface 104 in the vehicle vertical direction and behind the seating area 102 in the vehicle longitudinal direction. The recessed opening 116 is defined by a front wall 118, a rear wall 122 opposite the front wall 118, and a bottom wall 120 extending between the front wall 118 and the rear wall 122. The front wall 118 and the bottom wall 120 contain connection brackets 124, 126 that may couple with a first pivotable linkage member 128 and a second pivotable linkage member 129 as described below.

The seat 100 includes a seat cushion frame 130, a seat back 132, a handle 134 front leg 136, a rear leg 138, a cable 140, a damping device 142, a seat striker 144, a first pivotable linkage member 128, and a second pivotable linkage member 129, described in detail below. The seat cushion frame 130 has a front portion 146, a rear portion 148 opposite the front portion 146, a center portion 127 between the front portion 146 and rear portion 148, a top portion 150 and an open bottom portion 152 opposite the top portion 150. The top portion 150 of the seat cushion frame 130 may include a cushion that is configured to support the buttock of an occupant. The seat back 132 has a forward portion 154 and a back portion 156 opposite the forward portion 154, a lower portion 158 and an upper portion 160 opposite the lower portion 158. A head rest 162 is located proximal to the upper portion 160 of the seat back 132. The forward portion 154 of the seat back 132 may support the back of a passenger. The lower portion 158 of the seat back 132 is rotatably coupled to the rear portion 148 of the seat cushion frame 130 as to move the seat back 132 between a folded position so as to face the top portion 150 of the seat cushion frame 130 and an upright position where in the seated state the seat 100 is in the upright position and in the stowed state, the seat 100 is in the folded position.

The first pivotable linkage member 128 extends from the bottom connection bracket 126 on the bottom wall 120 of the recessed opening 116 and the second pivotable linkage member 129 extends from the front connection bracket 124 on the front wall 118 of the storage area 106 to the center portion 127 seat cushion frame 130. In some embodiments the first pivotable linkage members 128 is coupled to the rear leg 138. The upper portion 160 of the seat back 132 contains the handle 134 operable to engage with the cable 140, which extends from the handle 134 to the seat latch 114 of the rear leg 138. The cable 140 is operable to activate the seat latch 114. It should be understood that in embodiments, the handle 134 may be any other mechanism that may engage with the cable 140, for example, a button, a lever, a pull tab, voice command or the like. Further, the handle 134 may be located at any location on the seat 100. In embodiments, a cable 141 may extend from the handle 134 to the front seat latch 112 to be operable to activate the front seat latch 112.

Figure 2:
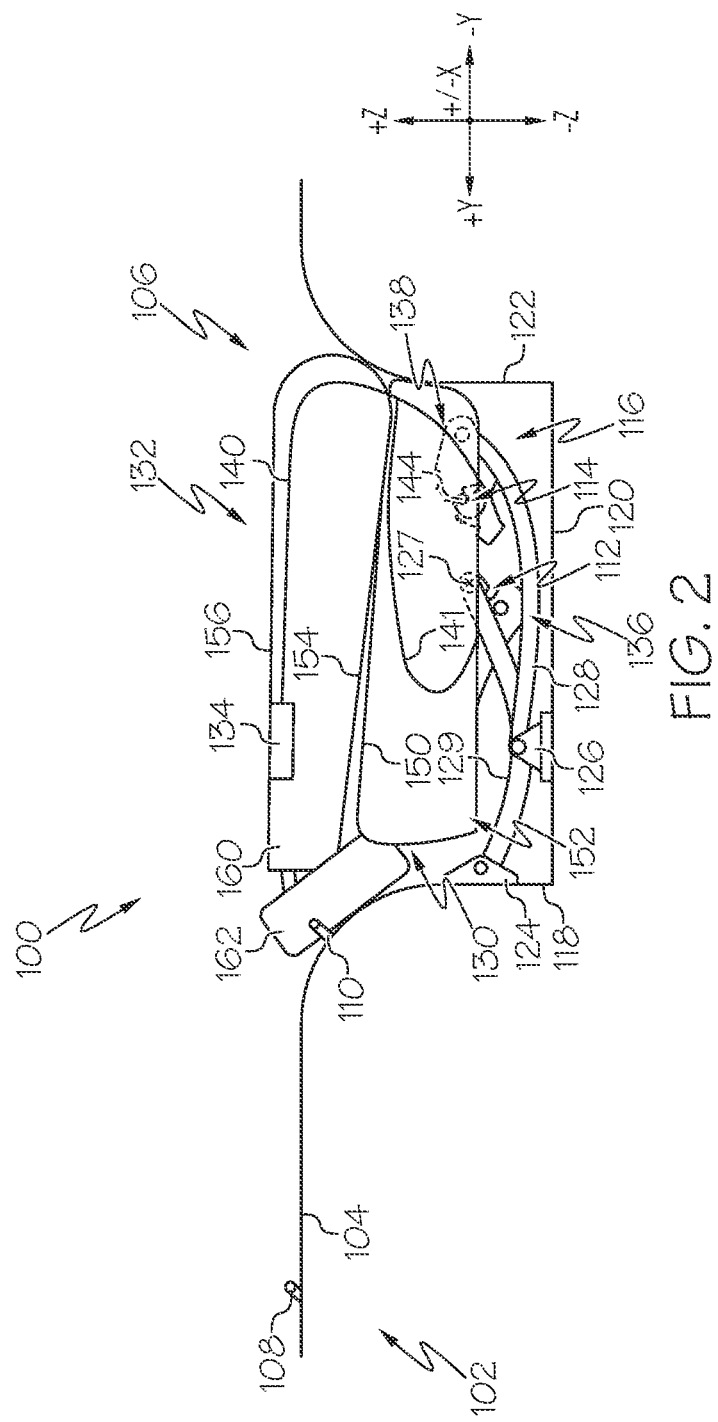
FIG. 2 schematically depicts a partial side view of the vehicle of FIG. 1 with the seat in a stowed state, according to one or more embodiments shown and described herein.

The front leg 136 extends from the open bottom portion 152 of the seat cushion frame 130 and is rotatably coupled to the front portion 146 of the seat cushion frame 130 to move between an extended position (FIG. 1) and a rotated position (FIG. 2). The front leg 136 has a connected portion 164 and an extended portion 166 opposite the connected portion 164. The connected portion 164 pivotally connects the extended portion 166 to the seat cushion frame 130. The extended portion 166 includes an opening 168 formed therein and a front seat latch 112 that may engage with the front floor striker 108. In embodiments, the cable 140 may extend to operate the front seat latch 112.

The rear leg 138 extends from the open bottom portion 152 of the seat cushion frame 130 and is rotatably coupled to the rear portion 148 of the seat cushion frame 130 to be movable between an extended position (FIG. 1) and a rotated position (FIG. 2). The rear leg 138 has a connected portion 170 pivotally coupling to the rear portion 148 of the seat cushion frame 130 and an extended portion 172 opposite the connected portion 170. Further, the rear leg 138 has a first side 174 and a second side 176 opposite the first side 174 extending between the connected portion 170 and extended portion 172. The first side 174 defines a cutout 178 that includes a recessed wall 180, as seen in more detail in FIGS. 3A and 3B formed in the first side 174. Movable in the cutout 178 of the rear leg 138 is a hook 182. The hook 182 and the cutout 178 work together to create the seat latch 114. The seat latch 114 engages with the floor striker 110 and the seat striker 144, as described below. The cable 140 extends to operate the seat latch 114.

The seat striker 144 is provided on the seat cushion frame 130 at a location to engage with the seat latch 114 of the rear leg 138 when the rear leg 138 is in the rotated position, as described in more detail herein. In embodiments, the rear leg 138 is in the rotated position when the seat 100 is in the stowed state. As described in more detail in FIGS. 3A and 3B herein, the seat striker 144 may be an extended pin that is slidably coupled to a slot 145 or any other member that may engage with the seat latch 114. In embodiments, the slot 145 is formed in a side wall of the seat cushion frame 130. However, the slot 145 may be in any location of the seat 100 to allow the seat striker 144 to slidably move through the slot 145 and engage with the seat latch 114. The seat striker 144 is movable through the slot 145 between a disengaged position and an engaged position and is biased towards the disengaged position with a biasing member 188 and mounting portion 189. In some embodiments, the seat striker 144 may move along a substantially lateral track between the engaged position and the disengaged position through the slot 145. In other embodiments, the seat striker 144 may move along an arcuate path. In embodiments, a damping device 142 extends between the front leg 136 and the rear leg 138 as to apply a forward force against the front leg 136 in the vehicle longitudinal direction such that the front leg 136 is pushed toward the extended position as the seat 100 moves from the stowed state to the seated state. In embodiments, the damping device 142 may be a gas shock spring or the like.

Referring still to FIG. 1, in the seated state, the seat 100 is positioned substantially above the floor surface 104 of the seating area 102. The seat back 132 is in the upright position perpendicular to the seat cushion frame 130. The front leg 136 is in the extended position with the front seat latch 112 engaged with the front floor striker 108 and the rear leg 138 is in the extended position with the seat latch 114 engaged with the floor striker 110. The seat striker 144 is in the disengaged position. The first pivotable linkage member 128 is in a substantially vertical position extending between the connection bracket 126 on the bottom wall 120 of the storage area 106 and the rear leg 138 of the seat cushion frame 130.

Referring now to FIG. 2, the seat 100 is shown positioned in the stowed state. In the stowed state, the seat back 132 is in the folded position with the forward portion 154 of the seat back 132 substantially in contact with the top portion 150 of the seat cushion frame 130. The head rest 162 is folded inward to be tucked between the upper portion 160 of the seat back 132 and the front wall 118 of the storage area 106. The seat cushion frame 130, the seat back 132, and the head rest 162 are positioned in the recessed opening 116 of the storage area 106 between the front wall 118 and the rear wall 122 with the back portion 156 of the seat back 132 facing upwards. The first pivotable linkage member 128 and the second pivotable linkage member 129 are pivoted around the connection brackets 124, 126 to be in a substantially horizontal position, parallel to the seat cushion frame 130 and at least partially inside the open bottom portion 152 of the seat cushion frame 130.

In the stowed state, the front leg 136 and the rear leg 138 of the seat 100 are in the rotated position. The front seat latch 112 of the front leg 136 is disengaged. The seat latch 114 of the rear leg 138 is engaged with the seat striker 144, which is moved into the engaged position. As such, the seat striker 144 is positioned in the cutout 178 in the first side 174 of the rear leg 138 with the hook 182 engaged as to maintain the rear leg 138 in the rotated position and the seat 100 in the stowed state as seen with better detail in FIG. 3B.

Figure 3A:
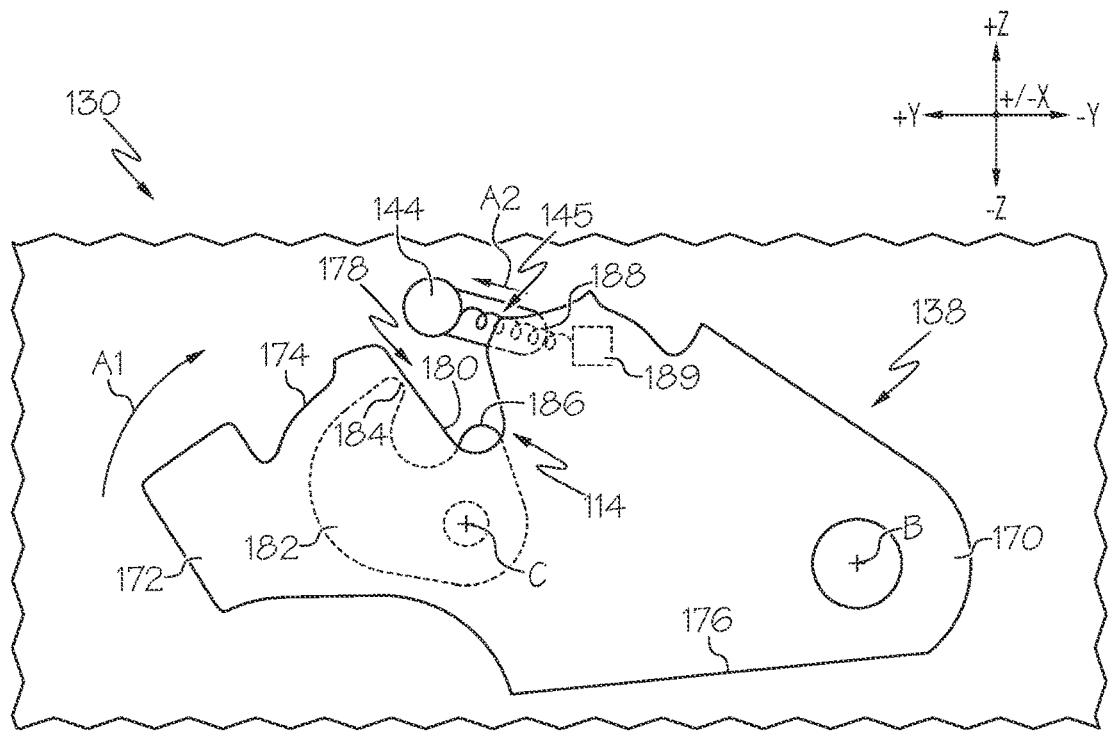
FIG. 3A schematically depicts a side view of a rear leg of the seat of FIG. 1 in an intermediate position, according to one or more embodiments shown and described herein.
Figure 3B:
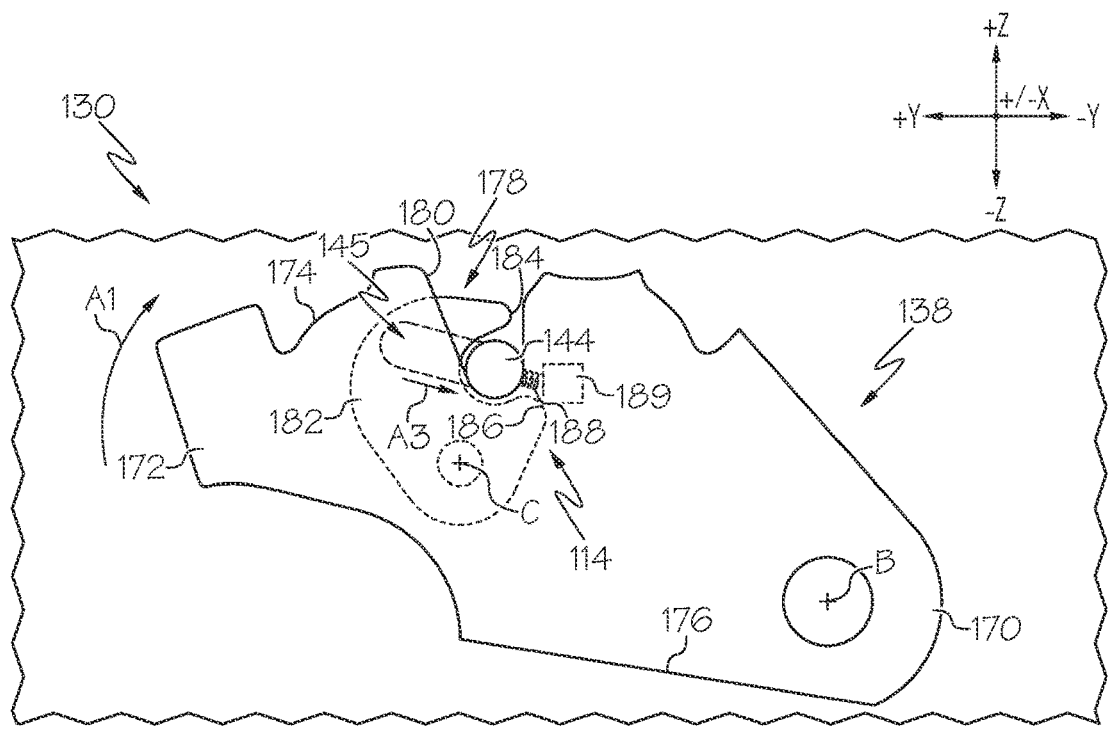
FIG. 3B schematically depicts a side view of the rear leg of FIG. 3A in a rotated position, according to one or more embodiments shown and described herein.

In FIGS. 3A and 3B, an isolated view of the rear leg 138 and the seat striker 144 moving from a partially rotated or intermediate position of the rear leg 138 in to the rotated position is depicted. In the intermediate position, shown in FIG. 3A the rear leg 138 is in a position between the extended position and the rotated position and may occur when the seat is moving between the seated state and the stowed state, The seat striker 144 is biased toward the disengaged position by the biasing member 188 applying a force in the direction of arrow A2. The biasing member 188 extends between the mounting portion 189 and the seat striker 144 rearward of the seat striker 144 in the vehicle longitudinal direction. In some embodiments, the mounting portion 189 and biasing member 188 may be located frontward of the seat striker 144 in the vehicle longitudinal direction and apply a force as to bias the seat striker 144 in the disengaged position in the direction of arrow A2. As shown in FIG. 3A, the hook 182 of the seat latch 114 has a first end 184 and a second end 186, and is positioned in an unlocked position such that the seat striker 144 is permitted to enter the cutout 178. The second end 186 of the hook 182 of the seat latch 114 may extend partially into the cutout 178 of the first side 174 of the rear leg 138.

Referring now to FIG. 3B, with the rear leg 138 in the rotated position, the seat striker 144 is shown in the engaged position within the cutout 178. The biasing member 188 is compressed in the direction of arrow A3 as the seat latch 114 causes the seat striker 144 to remain in the engaged position. The first end 184 of the hook 182 of the seat latch 114 extends into the cutout 178 and prevents the seat striker 144 from moving out of the cutout 178.

To move from the seated state of FIG. 1 to the stowed state of FIG. 2, the handle 134 is activated by a user, engaging the front seat latch 112 and seat latch 114 using the cable 140. The front seat latch 112 disengages the front floor striker 108 and the seat latch 114 disengages the floor striker 110 to permit the first pivotable linkage member 128 and the second pivotable linkage member 129 to pivot about the connection brackets 124, 126 and the user to move the seat 100 from the seated state to the stowed state. The front leg 136 pivots to the rotated position. The rear leg 138 pivots into the rotated position while engaging with the seat striker 144 as described in more detail below. In embodiments, the first pivotable linkage member 128 is coupled to the rear leg 138 to cause the rear leg 138 to pivot into the rotated position. In embodiments, the handle 134 is only activated once to allow the seat 100 to more between positions. Similarly, to move the seat 100 from the stowed position to the seated position, the handle 134 is once again activated to cause the seat latch 114 to disengage the seat striker 144. The damping device 142 engages with the front leg 136 and the rear leg 138 to aid the user to move the seat 100 into the seated state. The front leg 136 and rear leg 138 are aided by the damping device 142 to rotate to the extended positions. The front seat latch 112 reengages with the front floor striker 108 and the seat latch 114 reengages with the floor striker 110 to 'lock' the seat 100 in the seated state.

In use, as the rear leg 138 moves from the intermediate position shown in FIG. 3A in the direction of arrow A1 about axis B to the rotated position shown in FIG. 3B, the seat striker 144 engages with the recessed wall 180 of the cutout 178 to move through the slot 145 from the disengaged position and into the engaged position. In the disengaged position the seat striker 144 is spaced apart from the seat latch 114, and in the engaged position the seat striker 144 is engaged with the seat latch 114. The recessed wall 180 abuts and pushes the seat striker 144 from the disengaged position to the engaged position to enter the cutout 178. In embodiments, as the seat striker 144 is received within the cutout 178, the seat striker 144 applies a force against the second end 186 of the seat latch 114 to rotate the seat latch 114 about axis C and move the seat latch 114 into the locked position from the unlocked position such that the first end 184 of the hook 182 is positioned within the cutout 178. In the unlocked position the seat 100 is permitted to move between the seated state and the stowed state, and in the locked position the engagement of the seat striker 144 in the seat latch 114 inhibits movement of the seat 100 from the stowed state towards the seated state.

To reposition the seat 100 into the seated state from the stowed state, a user pulls the handle 134 and causes the cable 140 to engage with the seat latch 114 to permit the rear leg 138 to move from the rotated position into the extended position. More particularly, the first end 184 of the hook 182 rotates about the axis C in a direction opposite the direction of arrow A1 to allow the seat striker 144 to move out of the cutout 178. The biasing member 188 applies a force against the seat striker 144 in the direction of arrow A2 such that the seat striker 144 moves from the engaged position to the disengaged position. The rear leg 138 then rotates in the direction opposite arrow A1 about the axis B allowing the user to return the seat 100 from the stowed position to the seated position.

From the above, it is to be appreciated that defined herein is a vehicle with a seat that is positionable between a seated state and a stowed state wherein one latch engages both the floor striker in the seated state and seat striker in the stowed state, operated with one mechanism. As such, a substantially vertically orientated position of the seat may be adjusted to a stowed position disposed in a storage space below the floor with one user mechanism.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a floor surface having a floor striker;
a seat moveable between a seated state and a stowed state, the seat including a seat cushion frame having a seat striker, a seat back rotatably coupled to the seat cushion frame, and a seat latch, in the seated state the seat latch engages with the floor striker and in the stowed state the seat latch engages with the seat striker,
wherein the seat striker is movably coupled to the seat cushion frame, the seat striker is configured to move with respect to the seat cushion frame between an engaged position and a disengaged position,
wherein upon movement of the seat from the seated state to the stowed state, the seat latch contacts the seat striker to move the seat striker from the disengaged position to the engaged position.

2. The vehicle of claim 1, wherein in the disengaged position the seat striker is spaced apart from the seat latch, and in the engaged position the seat striker is engaged with the seat latch.

3. The vehicle of claim 2, wherein upon movement of the seat striker from the disengaged position to the engaged position, the seat latch moves from an unlocked position to a locked position.

4. The vehicle of claim 3, wherein in the unlocked position the seat is permitted to move between the seated state and the stowed state, and in the locked position the engagement of the seat striker in the seat latch inhibits movement of the seat from the stowed state towards the seated state.

5. The vehicle of claim 4, wherein the seat cushion frame further comprises a slot, the seat striker slidably coupled within the slot to move between the disengaged position and the engaged position.

6. The vehicle of claim 5, wherein a biasing member biases the seat striker toward the disengaged position.

7. The vehicle of claim 6, further comprising:
a front floor striker provided on the floor surface; and
a front seat latch positionable between a locked positon and an unlocked position to engage the front floor striker when in the seated state.

8. The vehicle of claim 7, further comprising;
a rear leg containing the seat latch rotatably coupled to the seat cushion frame and positionable between an extended position and a rotated position; and
a front leg containing the front seat latch rotatably coupled to the seat cushion frame and positionable between an extended position and a rotated position.

9. The vehicle of claim 8, further comprising a damping device extending between the front leg and the rear leg, the damping device pushes the front leg and the rear leg into the extended position as the seat is moved from the stowed state to the seated state.

10. The vehicle of claim 9, further comprising a linkage member rotatably coupling the seat cushion frame to the floor surface.

11. The vehicle of claim 10, wherein the rear leg is coupled to the linkage member to move the rear leg from the extended position to the rotated position as the seat moves from the seated state to the stowed state.

12. The vehicle of claim 11, further comprising a handle, wherein operation of the handle when the seat is in the seated state permits the seat to be moved into the stowed state.

13. The vehicle of claim 11, wherein operation of the handle when the seat is in the stowed state permits the seat to be moved into the seated state.

* * * * *

UNITED STATES PATENT AND TRADEMARK OFFICE
CERTIFICATE OF CORRECTION

Page 1 of 1

PATENT NO. : 12,145,486 B2
APPLICATION NO. : 17/991276
DATED : November 19, 2024
INVENTOR(S) : Vasudeva S. Murthy, Christopher M. Vargo and Nicholas J. Schutzman It is certified that error appears in the above-identified patent and that said Letters Patent is hereby corrected as shown below:

In the Specification

In Column 1, Line(s) 40, delete "positon" and insert --position--, therefor.

In the Claims

In Column 8, Line(s) 5, Claim 7, delete "positon" and insert --position--, therefor.

Signed and Sealed this
Twenty-first Day of January, 2025

Coke Morgan Stewart
*Acting Director of the United States Patent and Trademark Office*